(12) United States Patent
Jones-McFadden et al.

(10) Patent No.: US 10,055,891 B2
(45) Date of Patent: Aug. 21, 2018

(54) SYSTEM FOR PREDICTION OF FUTURE CIRCUMSTANCES AND GENERATION OF REAL-TIME INTERACTIVE VIRTUAL REALITY USER EXPERIENCE

(71) Applicant: Bank of America Corporation, Charlotte, NC (US)

(72) Inventors: Alicia C. Jones-McFadden, Fort Mill, SC (US); Matthew Hsieh, Charlotte, NC (US); Scott R. Enscoe, Charlotte, NC (US); Raghav Anand, Chadds Ford, PA (US); Michael Anderson, Colleyville, TX (US); Elizabeth Ann Miller, Brooklyn, NY (US); Daniel Shilov, Nashua, NH (US); Alicia Anli Salvino, Rockville, MD (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 63 days.

(21) Appl. No.: 15/288,081

(22) Filed: Oct. 7, 2016

(65) Prior Publication Data
US 2018/0101985 A1  Apr. 12, 2018

(51) Int. Cl.
| | |
|---|---|
| G09G 5/00 | (2006.01) |
| G06T 19/00 | (2011.01) |
| G06K 9/00 | (2006.01) |
| G02B 27/01 | (2006.01) |
| G06F 3/01 | (2006.01) |

(52) U.S. Cl.
CPC .......... G06T 19/006 (2013.01); G02B 27/017 (2013.01); G06K 9/00671 (2013.01); G06F 3/011 (2013.01); G06F 3/012 (2013.01); G06T 19/00 (2013.01)

(58) Field of Classification Search
CPC ....... G06T 19/006; G06T 19/00; G06F 3/011; G06F 3/012; G02B 27/017; G06K 9/00671
See application file for complete search history.

(56) References Cited

U.S. PATENT DOCUMENTS

| | | | |
|---|---|---|---|
| 7,231,608 B1* | 6/2007 | Fano | G06Q 40/02 |
| | | | 715/760 |
| 7,296,734 B2 | 11/2007 | Pliha | |
| 7,624,073 B1 | 11/2009 | Robinson et al. | |
| 7,657,471 B1 | 2/2010 | Sankaran et al. | |
| 7,788,147 B2 | 8/2010 | Haggerty et al. | |
| 7,840,463 B1 | 11/2010 | Davis | |
| 7,865,419 B2 | 1/2011 | Rojeck et al. | |
| 7,895,096 B1 | 2/2011 | Vu et al. | |
| 7,912,770 B2 | 3/2011 | Haggerty et al. | |
| 8,024,213 B1* | 9/2011 | Fano | G06Q 30/0201 |
| | | | 705/1.1 |
| 8,060,423 B1 | 11/2011 | Rukonic et al. | |
| 8,065,250 B2 | 11/2011 | Stephens | |
| 8,069,103 B1 | 11/2011 | Davis | |
| 8,073,759 B1 | 12/2011 | Del Favero et al. | |

(Continued)

*Primary Examiner* — Abderrahim Merouan (74) *Attorney, Agent, or Firm* — Michael A. Springs; Moore & Van Allen PLLC; James C. Edwards (57) ABSTRACT

Systems provide for a virtual reality experience of a predicted future state based on the occurrence or contemplation of an event. Other systems herein described provide for an augmented reality experience that replaces an object within view with an augmented display of the object based on the predicted future state of the object.

18 Claims, 5 Drawing Sheets

(56) References Cited

U.S. PATENT DOCUMENTS

| | | |
|---|---|---|
| 8,229,806 B1 | 7/2012 | Chapman et al. |
| 8,260,699 B2 | 9/2012 | Smith et al. |
| 8,306,894 B2 | 11/2012 | Newman et al. |
| 8,346,568 B1* | 1/2013 | Del Favero ............ G06Q 40/00 705/1.1 |
| 8,401,889 B2 | 3/2013 | Chwast et al. |
| 8,429,038 B1 | 4/2013 | Harman et al. |
| 2002/0174185 A1 | 11/2002 | Rawat et al. |
| 2003/0139986 A1 | 7/2003 | Roberts, Jr. |
| 2004/0122625 A1* | 6/2004 | Nasser ............... G05B 23/0218 702/185 |
| 2010/0257066 A1 | 10/2010 | Jones et al. |
| 2012/0185368 A1 | 7/2012 | Schloter et al. |
| 2012/0187794 A1 | 7/2012 | Inoue et al. |
| 2012/0197794 A1 | 8/2012 | Grigg et al. |
| 2012/0221446 A1 | 8/2012 | Grigg et al. |
| 2012/0230548 A1* | 9/2012 | Calman ............. G06K 9/00791 382/104 |
| 2012/0233089 A1* | 9/2012 | Calman ................. G06Q 40/00 705/36 R |
| 2012/0330971 A1 | 12/2012 | Thomas et al. |
| 2013/0041819 A1 | 2/2013 | Khasho |
| 2013/0083018 A1* | 4/2013 | Geisner ................... G06F 3/011 345/420 |
| 2013/0282542 A1* | 10/2013 | White ................... G06Q 40/00 705/35 |
| 2014/0229233 A1 | 8/2014 | Hu |
| 2015/0002542 A1* | 1/2015 | Chan ....................... G06F 3/048 345/633 |
| 2015/0046307 A1 | 2/2015 | Calman et al. |
| 2015/0294048 A1 | 10/2015 | Jones |
| 2015/0294385 A1* | 10/2015 | Grigg ................ G06Q 30/0613 705/26.41 |
| 2015/0294389 A1* | 10/2015 | Jones ................ G06Q 30/0629 705/26.64 |
| 2016/0210700 A1 | 7/2016 | Ventura et al. |
| 2016/0232526 A1 | 8/2016 | Vasant Akole et al. |
| 2016/0284126 A1* | 9/2016 | Leppanen ............... G06F 3/011 |
| 2016/0321551 A1* | 11/2016 | Priness .................. G06N 5/047 |
| 2017/0201779 A1* | 7/2017 | Publicover ........... H04N 21/252 |
| 2017/0316607 A1* | 11/2017 | Khalid ................. G06T 19/006 |

* cited by examiner

SYSTEM FOR PREDICTION OF FUTURE CIRCUMSTANCES AND GENERATION OF REAL-TIME INTERACTIVE VIRTUAL REALITY USER EXPERIENCE

FIELD OF THE INVENTION

In general, embodiments herein disclosed relate to virtual and/or augmented reality and, more specifically, generating virtual and/or augmented reality user experiences based on predicting future user circumstances.

BACKGROUND

Virtual reality is an artificial environment that is created through implementation of computer code and presented to a user through a multimedia presentation, typically a three-dimensional presentation or the like. Virtual reality allows for the user to suspend belief in what is actually occurring (i.e., reality) and experience an artificial (i.e., virtual) reality, in which the user can explore and interact with the virtual environment. Interaction is achieved by allowing the user to virtually manipulate objects or perform actions within the virtual environment. Virtual reality experiences may be presented to the user via any computer display; however, virtual reality is enhanced when the experiences are displayed on wearable computers, such as Optical Head-Mounted Displays (OHMDs) or the like.

Augmented reality, otherwise referred to as AR, provides for a live direct or indirect view of an actual, real-world environment in which one or more elements/objects in the view have been augmented or supplemented by computer-generated sensory input (e.g., graphics, video, sound or the like). As such, the actual reality view is modified by the computer, which enhances the user's current perception of reality. Augmented reality experiences are typically provided to users via an image-capturing device and, similar to the previously described virtual reality experiences, augmented reality experiences tend to be heightened through use of Optical Head-Mounted Displays (OHMDs) or the like.

Therefore, a need exists to further the capabilities of virtual and augmented reality experiences and, in particular, provide virtual and/or augmented reality experiences that allow the user to gain insight into predicted future circumstances.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Systems are described herein that provide for a virtual reality experience of a user's predicted future state based on the occurrence or contemplation of an event. Other systems herein described provide for an augmented reality experience that replaces an object within view with an augmented display of the object based on the predicted future state of the object. As such a user is able to readily appreciate what their future state will or might be based the occurrence of an event and/or what a future state of a physical object may look like based on attributes associated with the user.

A system for providing an augmented reality display of a predicted future state of an object defines first embodiments of the invention. The system includes a wearable computing device including a memory, at least one processor in communication with the memory, an image-capturing device in communication with the processor, and an Optical Head-Mounted Display (OHMD) in communication with the processor. The system additionally includes a database configured to store attributes associated with a user of the wearable computing device.

In addition, the system includes a predicted future state module that is stored in the memory and executable by the processor. The predicted future state module is configured to capture, via the image-capturing device, an image of an object, identify the object, retrieve, from the database, one or more attributes associated with the user, predict a future state of the object based on the identification of the object and the one or more attributes associated with the user, and display, in the OHMD, an augmented reality view that replaces the object with the future state of the object.

In specific embodiments of the system, the predicted future state module is further configured to identify the object by implementing one or more object recognition techniques. In further specific embodiments of the system, the predicted future state module is further configured to identify a current state (i.e., the current condition) of the object. In such embodiments of the system, the predicted future state of the module is further configured to predict the future state of the object based on the identification of the object, the current state of the object and the one or more attributes associated with the user.

In other specific embodiments of the invention, the predicted future state module is further configured to identify the current state that includes a current value of the object. In such embodiments of the system the predicted future state module is further configured to predict the future state of the object based on the identification of the object, the current value of the object and the one or more attributes associated with the user.

In still further specific embodiments of the system, the predicted future state module is further configured to predict a future state of the object based on the identification of the object and the one or more attributes associated with the user, wherein the future state is for a predetermined future period in time. In related specific embodiments of the system, the predicted future state module provides for the user to configure the predetermined future period in time either prior to capturing the image of the object or after capturing the image of the object (i.e., dynamically, on-the-fly).

In still further specific embodiments of the invention, the predicted future state module is further configured to predict the future state of the object, wherein the future state of the object is a replacement object.

In other specific embodiments of the system, the database configured to store the attributes, further defines the attributes as financial performance attributes, such as but not limited to, savings amounts, historical savings performance, loan amounts, historical loan repayment performance, current inflow and outflow of financial resources and the like. In such embodiments of the system, the predicted future state module is further configured to predict the future state of the object based on the identification of the object and the one or more financial performance attributes.

A system for providing a user a virtual reality experience of a future state of the user defines second embodiments of the invention. The system includes a mobile computing device including a memory and at least one processor in communication with the memory. The system additionally includes a database configured to store attributes associated with a user of the mobile computing device. Further the system includes a virtual reality experience module that is stored in the memory and executable by the processor. The virtual reality experience module is configured to receive an input that indicates an occurrence or contemplation of an event associated with the user, retrieve, from the database, one or more, attributes associated with the user and generate at least one virtual reality experience of a future state of the user based on the occurrence or contemplation of the event and the one or more attributes associated with the user, and provide for the at least one virtual reality experience to be displayed to the user, on the mobile computing device, in response to the occurrence of or the contemplation of the event.

In specific embodiments of the system, the mobile computing device is further defined as a wearable computing device including an Optical Head-Mounted Display (OHMD) that is configured to display the virtual reality experience to the user.

In other specific embodiments of the system, the virtual reality experience module is further configured to generate the at least one virtual reality experience of the future state of the user based on the occurrence of or contemplation of the event and the one or more attributes associated with the user, wherein the future state is defined by a predetermined future time period. In further specific embodiments of the system, the virtual reality experience module provides for the user to configure the predetermined future time period either prior to the occurrence or contemplation of the event or after the occurrence or the contemplation of the event (i.e., dynamic configuration of the future time period).

In still further specific embodiments of the invention, the virtual reality experience module is further configured to generate at least two virtual reality experiences of the future state of the user, wherein a first virtual reality experience is based on the event being contemplated occurring and a second virtual reality experience is based on the event being contemplated not occurring.

In other specific embodiments of the system, the database configured to store attributes associated with a user further defines the attributes as profile attributes associated with the user and financial attributes associated with the user. In such embodiments, the financial attributes include one or more of historical transaction records, current savings amount, historical savings performance, current loan amounts, historical loan repayment performance, current inflow and outflow of finances, and financial goals. In related embodiments of the system, the virtual reality experience module is further configured to receive an input that indicates an occurrence of or contemplation of an event associated with the user, wherein the event is further defined as a financial transaction, such that the virtual reality experience module is further configured to generate the at least one virtual reality experience of a financial trajectory of the user based on the occurrence of or contemplation of the financial transaction and the one or more financial attributes associated with the financial transaction.

Thus, as described in more detail below, the present invention provides for a virtual reality experience of a user's predicted future state based on the occurrence or contemplation of an event and attributes associated with the user. Additionally, systems described in more detail below, provide for an augmented reality experience that replaces an actual viewed object with an augmented display of a future predicted state object based attributes associated with a user. As such, embodiments of the invention, allow for a user to readily comprehend what their future state will or might be based the occurrence of an event and attributes associated with the user and/or what a future state of a physical object will or might be based on attributes associated with the user.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, systems, apparatus, computer programs and the like are herein disclosed that provide for a virtual reality experience of a user's predicted future state based on the occurrence or contemplation of an event and attributes associated with the user. Additionally, systems described in more detail below, provide for an augmented reality experience that replaces an actual viewed object with an augmented display of a future predicted state object based attributes associated with a user. As such, embodiments of the invention, allow for a user to readily comprehend what their future state will or might be based the occurrence of an event and attributes associated with the user and/or what a future state of a physical object will or might be based on attributes associated with the user.

Figure 1:
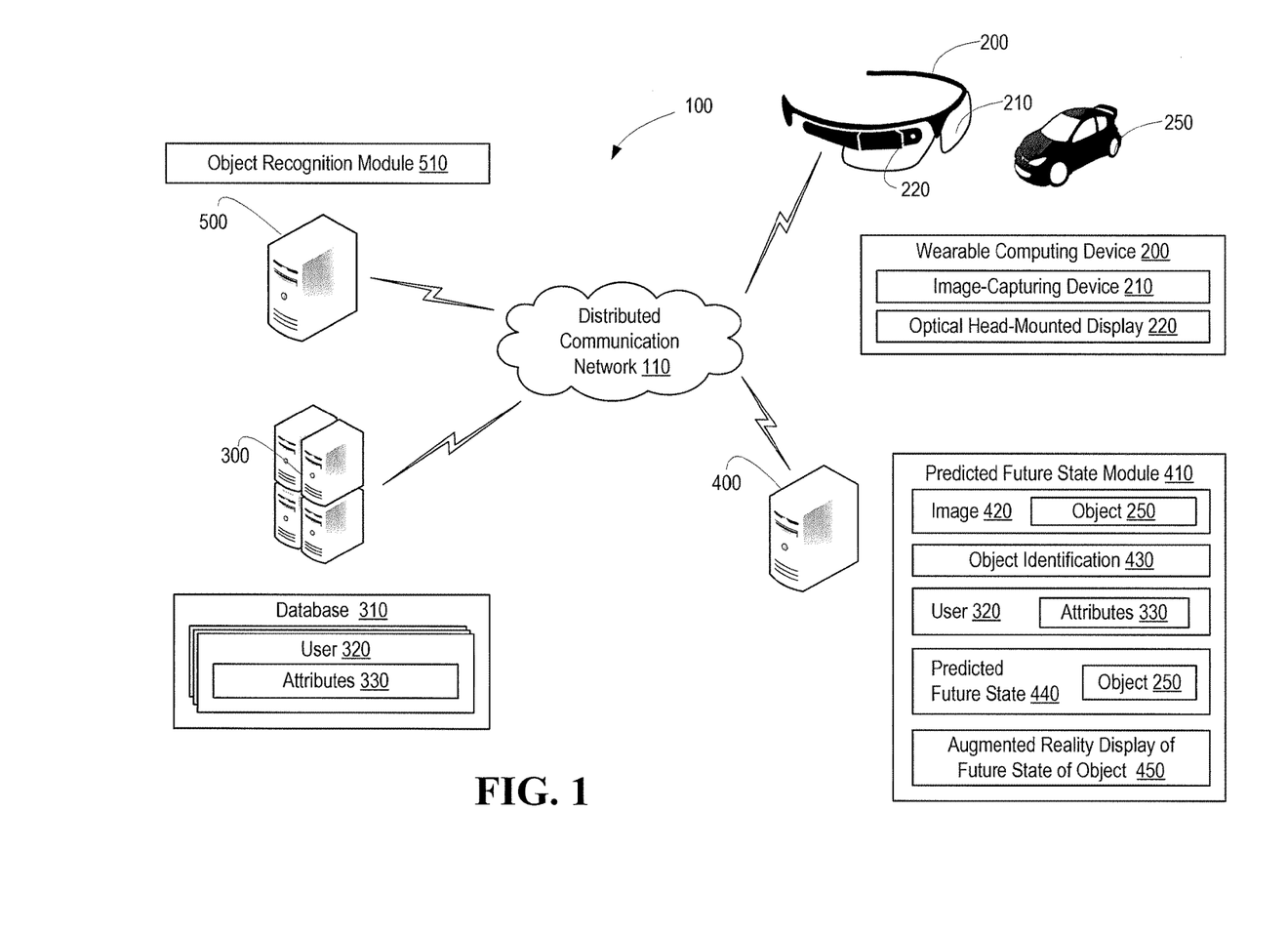
FIG. 1 is a schematic diagram of a system for providing an augmented reality display of a predicted future state of an object, in accordance with an embodiment of the invention.

FIG. 1 illustrates a system 100 configured for providing an augmented reality display of an object in a predicted future state, in accordance with embodiments of the present invention. The system 100 provides for data/information to be communicated, both wired and wireless, via distributed communication network 110, which may comprise the Internet or the like. The system includes a wearable computing device 200 that includes an image-capturing device 210, such as camera and/or video recording device, and an Optical Head-Mounted Display 220 that is configured to a user see their immediate surroundings and provide for display of information. The system additionally includes server 400 that is configured to store and execute predicted future state module 410. In optional embodiments of the invention, the predicted future state module 410 is stored and executed directly on the wearable computing device 200, obviating the need for server 400.

Predicted future state module 410 is configured to receive an image 420 of an object captured by the image-capturing device 210 of wearable computing device 200. In specific embodiments of the invention, the module 410 is configured to allow the user (i.e., wearer of the wearable computing device 200) to select which objects 250 the image-capturing device 210 will capture for the purpose of subsequently displaying an augmented reality display of the future state of the object. In other embodiments of the invention, the module may be configured to continuously receive images 420 (e.g., continuous video stream) and the identification of certain predetermined objects (e.g., vehicles, homes, jewelry, watches and the like) may trigger the module to proceed with a subsequent augmented reality display of the future state of the object.

Once the image 420 of the object 420 has been captured and/or received by the module 410, the module 410 implements object identification 430 to identify the object 250 in the image 420. In specific embodiments of the invention, the module 400 communicates, via distributed communication network 110, with a network entity, such as server 500 which stores and executes object recognition/identification module 510. In other embodiments of the invention, the object recognition/identification module 510 may be included within the predicted future state module 410, obviating the module 410 to make a call-out to a network-based object recognition module (i.e., server 500). The object recognition module may be configured to implement an artificial intelligence ("AI") engine. Module 510 may recognize objects that it has identified in prior uses by way of the AI engine. In this way, the module 510 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module, such as predicted future state module 410, an indication that the object may be the same object previously recognized. In this regard, the AI engine may provide a baseline or starting point from which to determine the nature of the object. In other embodiments, the AI engine's recognition of an object is accepted as the final recognition of the object.

In other embodiments of the invention, in which the object 250 has not previously been identified, the object recognition module relies on markers to identify objects. A marker is may be any type of characteristic of the object that is a distinguishing feature that can be interpreted by the object recognition module 510 to identify specific objects. For instance, a marker may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, and the like. In some embodiments, the marker may be audio captured by the image-capturing device 210 and the object recognition module 510 may be capable of utilizing audio recognition to identify words or unique sounds emanating from the. The marker may be any size and/or shape. Indeed, in some embodiments, the marker may be very small relative to the object 250 such as the alpha-numeric characters that identify the name or model of an object 250, whereas, in other embodiments, the marker is the entire object 64 such as the unique shape, size, structure, or the like.

Predicted future state module 410 is further configured to access, via distributed communication network 110, database 310 to retrieve attributes 330 associated with the user 320 (i.e., the wearer of the wearable computing device 200). In specific embodiments of the invention, the database 310 is stored remotely at servers 300 or the like. The attributes 330 may be any information associated with the user 320 that has an effect on a future state/condition of the object 250. In specific embodiments of the invention, the attributes 330 may be financial performance/outlook attributes that provide an indication of the user's current financial performance/status/outlook. Such information may be instrumental in determining what type of upkeep/maintenance the user may be able to provide for the existing object 250 (if the object 250 is currently possessed by the user), what type of replacement object is foreseen for the existing object 250 (if the object 250 is currently possessed by the user, or, what type of similar object the user can envision possessing in the future (if the object 250 is not currently possessed by the user).

Once the module 410 has identified the object 250 and received the attributes 330 associated with the user 320, the module 410 determines a predicted future state 440 of the object 250 that is associated with the user 320 (i.e., user-specific) based at least on the identification of the object 250 (i.e., what the object 250 is) and the attributes 330 associated with the user 330. The predicted future state 440 of the object may be a future condition of the existing object, a replacement object for the existing object or object of a similar type that the user is likely to and/or capable of possessing in the future.

Once the predicted future state 440 of the object is known, the module 410 is configured to provide an augmented reality display 450, within the OHMD 220 of the wearable computing device 200 that replaces the actual object 250 with an object in its predicted future state 440. Augmented reality allows the user to view their actual surroundings/environment while augmenting (i.e., changing in some way) certain elements/aspects of the actual surroundings/environment, such that, the augmented elements/aspects appear to be "real" from the perspective of the user. Thus, in the present invention, the object 250 is augmented (i.e., replaced with the predicted future state 440 of the object 250) such that the user perceives, through the OHMD, that the predicted future state 440 of the object 250 is the actual object. In this regard, augmented reality provides for the predicted future state 440 of the object 250 to move within the OHMD based on movements by the user and/or movements of the actual object 250. For example, the predicted future state 440 of the object 250 may provide for the object 250 to appear in an improved or deteriorated condition or for the object 250 to be replaced with another object (i.e., a new and/or improved object or an older and/or lesser object).

Figure 2:
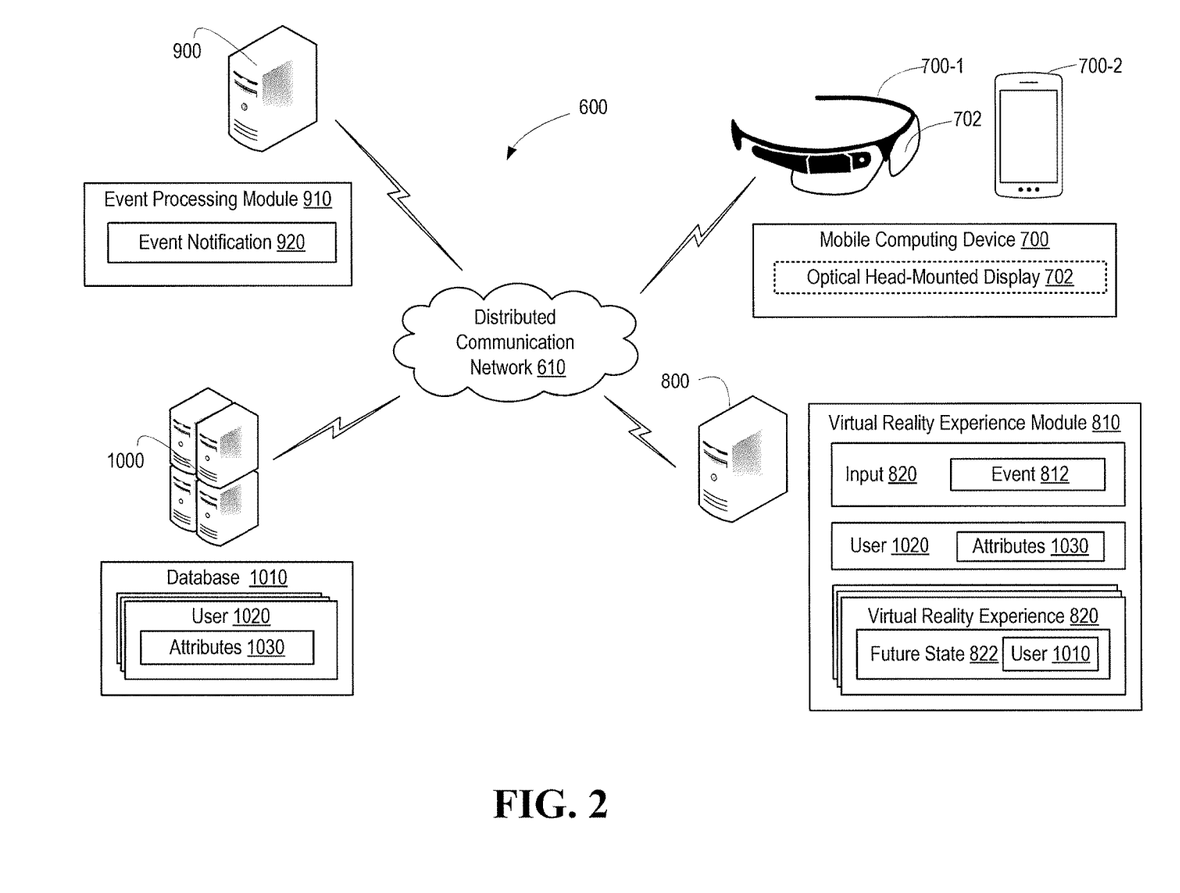
FIG. 2 is a schematic diagram of a system for providing a virtual reality presentation of a user's predicted future state, in accordance with an embodiment of the invention.

FIG. 2 illustrates a system 600 configured to provide a virtual reality experience based on a predicted future state of a user, in accordance with embodiments of the present invention. The system provides for data/information to be communicated, both wired and wireless, via distributed communication network 610, which may comprise the Internet or the like. The system includes a computing device 700 having a display suitable for presenting a virtual reality experience. The computing device may, in some embodiments, take the form of a wearable computing device 700-1 having an Optical head-Mounted Display 702. Such a wearable computing device 700-1 is especially suited for providing a user a more realistic virtual reality experience. However, in other embodiments of the invention, the computing device 700 may comprise a mobile computing device, such as mobile telephone or the like.

The system 600 additionally includes server 800 that is configured to store and execute virtual reality experience module 810. In optional embodiments of the invention, the virtual reality experience module 810 is stored and executed directly on the computing device 700, obviating the need for server 800.

The virtual reality experience module 810 is configured to receive an input 820 that indicates that an event 812 associated with a user has occurred or is being contemplated by the user. In specific embodiments of the system 600, the input 820 may be provided by the user after the event 812 has occurred or while the user is contemplating the event 812. In other embodiments of the system 600, the input 820 may be an event notification 920 communicated, via distributed communication network 610, from a network entity, such as server 900 that stores and executes an event processing module 910.

In specific embodiments of the system 600, the event 812 is a financial transaction either conducted or contemplated by the user. In such embodiments of the system 600, the user may provide an input 820 that identifies the financial transaction in terms of attributes associated with the transactions (e.g., item identification, transaction amount and the like). In other such embodiments of the system 600, the event processing module 910 is a financial transaction processing module 910 and the event notification 920 is a financial transaction notification that provides attributes associated with a previously conducted financial transaction. In specific embodiments of the invention, the event processing module 910 is configured to provide the event notification 920 in real-time to completion of the event 812. For example, in those embodiments in which the event processing module 910 is defined as a financial transaction processing module 910, completion of the financial transaction may immediately trigger generation and communication of the event notification 920 (i.e., financial transaction notification).

The virtual reality experience module 810 is further configured to access, via distributed communication network 610, database 1010 to retrieve attributes 1030 associated with the user 1020 (i.e., the user associated with the event 812). In specific embodiments of the invention, the database 1010 is stored remotely at server(s) 1000 or the like. The attributes 1010 may be any information associated with the user 320 that has an effect on a future state/condition of the user. In specific embodiments of the invention, the attributes 330 may be financial performance/outlook attributes that provide an indication of the user's current financial performance/status/outlook.

In response to receiving the input 820 and the attributes 1030, the virtual reality experience module 810 configured to generate a virtual reality experience 820 that depicts a predicted future state 820 of the user 1030 based at least one the input 820 and the attributes 1030 associated with the user. In specific embodiments of the system 600, the virtual reality experience may depict a future state (i.e., existence or life) for the user based on the input 820 and the attributes 1030 associated with the user. Thus, in those embodiments in which the input 820 is associated with a financial transaction and the attributes are associated with the user's current financial performance/status/outlook the virtual reality experience module 810 uses the financial transaction and/or the user's current financial performance/status/outlook in determining what the future holds or what the outlook in the future is for the user. For example, the user may be on a financial path that indicates that the user will be a home owner, own/lease a luxury vehicle and the like or, conversely, the user may be on a financial path that indicates that the user will live modestly, perhaps live in a rental unit and not own/lease a vehicle (i.e., use public transportation or the like).

In specific embodiments of the invention, the virtual reality experience in generated or updated on-the-fly, in response to input 820 and the user is notified, via an alert or the like, that the virtual experience has been generated or updated to reflect the input 820 and/or changes in the attributes 1030. The alert/notification may be configured to allow the user to access the virtual reality experience immediately, via the OHMD 702 of the wearable device 700-1 or the display of the mobile computing device 700-2.

Figure 3:
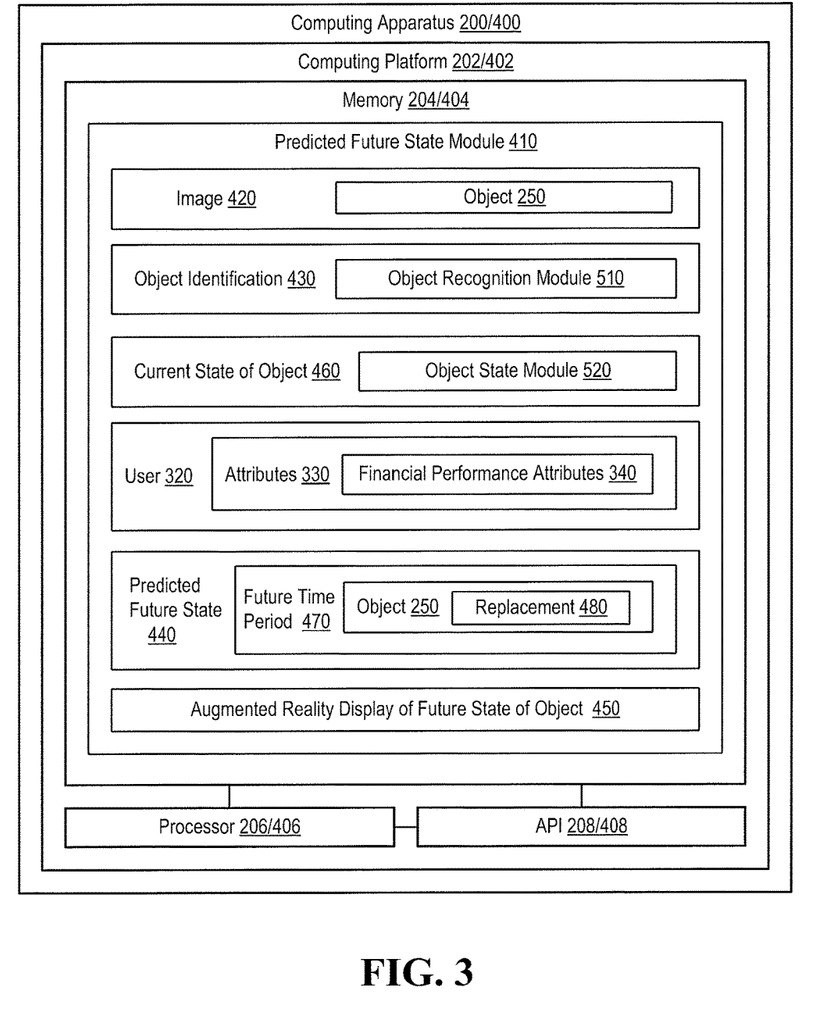
FIG. 3 is a block diagram illustrating a computing device configured for providing an augmented reality display of a predicted future state of an object, in accordance with an embodiment of the invention.

Referring to FIG. 3, a block diagram is presented of computing apparatus (200 or 400 of FIG. 1) configured for providing an augmented reality display of a future state of an object, in accordance with embodiments of the present invention. The computing apparatus 200/400 includes a computing platform 202/402 having a processor 204/404 and a memory 206/406 in communication with the processor. Additionally, in those embodiments of the invention in which the computing device is wearable computing device 200, the device includes an image-capturing device 210 (shown in FIG. 1) and an Optical-Head-Mounted Display (OHMD) 220 (shown in FIG. 1).

It should be noted that the apparatus 200/400 may include more than one computing device. For example, apparatus 200/400 may include the wearable computing device 200 and/or the server 400, which operate individually or in unison to provide an augmented reality display of a future state of an object. Thus, the logic shown and described in apparatus 200/400 may reside and be executed on a wearable computing device or a network device that is in wireless communication with the wearable computing device. As previously described in relation to FIG. 1, the wearable computing device may include an Optical Head-Mounted Display (OHMD), such that the wearable computing display is worn about the head of the user.

The memory 204/404 of apparatus 200/400 may be resident on the apparatus 200/400 or at least a portion of memory 204/404 may be remote memory that is network accessible to wearable computing device 200, for example, at least a portion of memory 204/404 may reside on servers or the like. Memory 204/404 may comprise volatile and nonvolatile memory such as read-only and/or random-access memory (RAM and ROM), EPROM, EEPROM, flash cards, or any memory common to computing platforms. Further, memory 204/404 may include one or more flash memory cells, or may be any secondary or tertiary storage device, such as magnetic media, optical media, tape, or soft or hard disk.

Processor 206/406 may be an application-specific integrated circuit ("ASIC"), or other integrated circuit set, processor, logic circuit, or other data processing device. Processor 206/406 or other processor such as an Application Specific Integrated Circuit (ASIC) may execute an application programming interface ("API") layer 208/408 that interfaces with any resident programs or modules, such as predicted future state module 410 stored in the memory 204/404 of the apparatus 200/400.

Processor 206/406 may include various processing subsystems (not shown in FIG. 3) embodied in hardware, firmware, software, and combinations thereof, that enable the functionality of apparatus 200/400 and the operability of the apparatus 200/400 on a network. For example, processing subsystems allow for initiating and maintaining communications, and exchanging data, with other networked devices. For the disclosed embodiments, processing subsystems of apparatus 200/400 may include any subsystem used in conjunction with applications, modules, components and routines described herein.

Computing platform 202/402 may additionally include a communications mechanism (not shown in FIG. 3) operable for initiating and maintaining communication, wired or wireless, between the apparatus 200/400 and network entities, such as servers storing database 310 and executing object recognition module 510.

Memory 204/404 stores predicted future state module 410 that is configured to determine the future state of an object and, in response to determining the future state of the object, present an augmented reality display that augments the actual object with a display of the future state of the object, in accordance with embodiments of the present invention. The module 410 is configured to receive an image 420 of an object. The image 420 may be a still-image captured by a traditional camera device or an image from a video stream captured by a video device. In those embodiments in which the module is executed on the wearable computing device 200 the image 420 is received/captured by the image-capturing device 210, while in other embodiments of the invention, the image 420 is received/captured by the image-capturing device 210 of the wearable computing device 200 and subsequently communicated, wirelessly to the server 400 executing the module 410. As previously noted in relation to FIG. 1, the module 400 may be configured to allow the user to select which images to capture (i.e., which objects the user desires to have their future state determined and shown) or which video stream to capture (from which the future states of objects within the video stream are determined and shown). In other embodiments of the invention, the module 410 may be configured to continuously capture a video stream and respond with determining a future state of an object when a predetermined object or predetermined type of object is identified in the video stream.

Once the image 420 of the object 420 has been captured and/or received by the module 410, the module 410 implements object identification 430 to identify the object 250 in the image 420. As previously discussed object identification may be conducted within the module 410 or the module 410 may access a remote object recognition module 510 to identify the object. The object recognition may implement an artificial intelligence ("AI") engine that is capable of recognizing objects that it has identified in prior instances by way of the AI engine. In this way, object identification/recognition may recognize specific objects and/or classes of objects, and store information related to the recognized objects in one or more memories and/or databases discussed herein. In other embodiments of the invention, in which the object 250 has not previously been identified, the object recognition module relies on markers to identify objects. A marker is may be any type of characteristic of the object that is a distinguishing feature that can be interpreted by the object recognition module 510 to identify specific objects.

In addition to identifying the object 250, the module 410 may be configured to identify the current state or condition of the object based on the image 420 of the object 250. Similar to identifying the object 250, determination of the current condition/state of the object may be conducted within the module 410 or the module 410 may access a remote object state module 520 to determine the current state/condition of the object. The object state determination may implement an artificial intelligence ("AI") engine that is capable of recognizing objects that it has identified in prior instances by way of the AI engine and compare the previous state of the object to the current state of the object to assess the current state of the object and/or the recline of decline in the state/condition of the object. In other embodiments of the invention, the object state module 520 relies on markers to identify the current state of the objects. A state/condition marker is may be any type of characteristic of the object that is a distinguishing feature that can be interpreted by the object state module 520 as effecting the current state of the object (e.g., irregularities in the shape, form of the object or the like).

The future state module 410 is further configured to access, via distributed communication network 110, database 310 to retrieve attributes 330 associated with the user 320 (i.e., the wearer of the wearable computing device 200). In specific embodiments of the invention, the database 310 is stored remotely at servers 300 or the like. The attributes 330 may be any information associated with the user 320 that has an effect on a future state/condition of the object 250. In specific embodiments of the invention, the attributes 330 may be financial performance/outlook attributes 340 that provide an indication of the user's current financial performance/status/outlook. For example, the financial performance outlook may include, but is not limited to, current savings, current rate at which funds are being saved, current loan balances, current loan re-payment status, current inflow and outflow of financial resources. In addition, current financial performance outlook may include, but is not limited to, future planned events effecting finances, such as home purchases, college tuition, weddings and the like. Such information may be instrumental in determining what type of upkeep/maintenance the user may be able to provide for an existing object 250 currently in possession of the user, what type of replacement object is foreseen for the existing object 250 in possession of the user or, what type of similar object the user can envision possessing in the future (user not currently possessing/owning the object 250).

Once the module 410 has identified the object 250 and received the attributes 330 associated with the user 320, the module 410 determines a predicted future state 440 of the object 250 that is associated with the user 320 (i.e., user-specific) based at least on the identification of the object 250 (i.e., what the object 250 is) and the attributes 330 associated with the user 330. In addition, the module may be configured to determine the predicted future state 440 for a predetermined time in the future 470. The predetermined time in the future 470 may be a date or a certain number of months, years in the future and may be defined within the module 410 either by the module provider or customized by the user. In addition, the predetermined time in the future 470 may be defined dynamically by the user at the time that the image 420 is captured or just prior to predicting the future state 440 of the object 250.

As previously discussed, in some instances the predicted future state 440 of the object may be a future condition of the existing object, for example, the future state may indicate that the future condition of the existing object is one of improved, deteriorated or the same. In other instances the predicted future state 440 may be a replacement 480 object for the existing object. For example, the user's current vehicle or home, is replaced with a different vehicle (e.g., an upgraded newer and/or improved make/model vehicle or a downgraded older or diminished make/model vehicle). In still further instances in which the object is not currently possessed/owned by the user, the predicted future state 440 of the object 440 may be a similar object or type of object that is consistent with the user's attribute data (e.g., the user's financial performance/status/outlook data).

Once the predicted future state 440 of the object had been determined, the module 410 is configured to provide an augmented reality display 450, within the OHMD 220 of the wearable computing device 200, which replaces the actual object 250 with an object in its predicted future state 440. As previously discussed, augmented reality allows the user to view their actual surroundings/environment while augmenting (i.e., changing in some way) certain elements/aspects of the actual surroundings/environment, such that, the augmented elements/aspects appear to be "real" from the perspective of the user. Thus, in the present invention, the actual object 250 is augmented (i.e., replaced with the predicted future state 440 of the object 250) in the OHMD, such that, the user perceives that the predicted future state 440 of the object 250 is the actual object that they are seeing. Further, augmented reality provides for the predicted future state 440 of the object 250 to move within the OHMD based on movements by the user and/or movements of the actual object 250.

Figure 4:
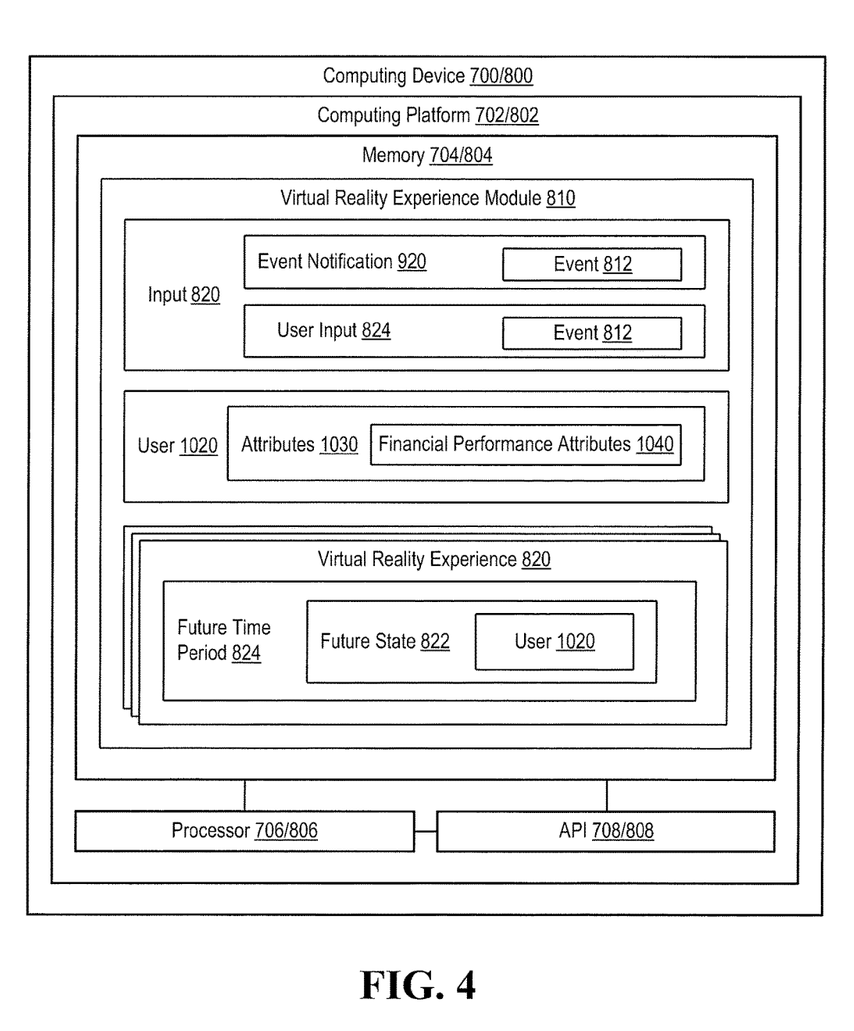
FIG. 4 is a block diagram of an apparatus configured to provide a virtual reality presentation of a user's predicted future state, in accordance with embodiment of the present invention.

Referring to FIG. 4, a block diagram is presented of computing apparatus (700 or 800 of FIG. 2) configured for providing a virtual reality experience for a predicted future state of a user, in accordance with embodiments of the present invention. The computing apparatus 700/800 includes a computing platform 702/802 having a processor 704/804 and a memory 706/806 in communication with the processor. Additionally, in those embodiments of the invention in which the computing device is wearable computing device 700-1, the device may include an Optical-Head-Mounted Display (OHMD) 220 (shown in FIG. 2) configured for displaying the virtual reality experience.

It should be noted that the apparatus 700/800 may include more than one computing device. For example, apparatus 700/800 may include mobile computing device 700 and/or the server 800, which operate individually or in unison to provide a virtual reality experience of a future state of a user.

Thus, the logic shown and described in apparatus 700/800 may reside and be executed on mobile computing device or a network device that is in wireless communication with mobile computing device. As previously described in relation to FIG. 2, the mobile computing device 700 may comprise a wearable computing device 700-1 including an Optical Head-Mounted Display (OHMD) 702 or a mobile telephone device 700-2.

The memory 704/804 of apparatus 700/800 may be resident on the apparatus 700/800 or at least a portion of memory 704/804 may be remote memory that is network accessible to mobile communication device 700, for example, at least a portion of memory 704/804 may reside on servers or the like. Memory 704/804 may comprise volatile and nonvolatile memory such as read-only and/or random-access memory (RAM and ROM), EPROM, EEPROM, flash cards, or any memory common to computing platforms. Further, memory 704/804 may include one or more flash memory cells, or may be any secondary or tertiary storage device, such as magnetic media, optical media, tape, or soft or hard disk.

Processor 706/806 may be an application-specific integrated circuit ("ASIC"), or other integrated circuit set, processor, logic circuit, or other data processing device. Processor 706/806 or other processor such as an Application Specific Integrated Circuit (ASIC) may execute an application programming interface ("API") layer 708/808 that interfaces with any resident programs or modules, such as virtual reality experience module 810 stored in the memory 704/804 of the apparatus 700/800.

Processor 706/806 may include various processing subsystems (not shown in FIG. 4) embodied in hardware, firmware, software, and combinations thereof, that enable the functionality of apparatus 700/800 and the operability of the apparatus 700/800 on a network. For example, processing subsystems allow for initiating and maintaining communications, and exchanging data, with other networked devices. For the disclosed embodiments, processing subsystems of apparatus 700/400 may include any subsystem used in conjunction with applications, modules, components and routines described herein.

Computing platform 702/802 may additionally include a communications mechanism (not shown in FIG. 4) operable for initiating and maintaining communication, wired or wireless, between the apparatus 700/800 and network entities, such as servers 1000 storing database 1010 and servers 900 executing event processing module 910.

Memory 704/804 stores virtual reality module 810 that is configured to generate and present a virtual reality experience based on a user's predicted future state/condition, in accordance with embodiments of the present invention. The virtual reality experience module 810 is configured to receive an input 820 that indicates that an event 812 associated with a user has occurred or is being contemplated by the user. In specific embodiments of the system 600, the input 820 may be a user input 824 that is provided by the user after the event 812 has occurred or while the user is contemplating the event 812. In other embodiments of the system 600, the input 820 may be an event notification 920 communicated, via distributed communication network 610, from a network entity, such as server 900 that stores and executes an event processing module 910.

In specific embodiments of the system 600, the event 812 is a financial transaction either conducted or contemplated by the user. In such embodiments of the system 600, the user may provide user input 824 that identifies a contemplated or completed financial transaction in terms of attributes associated with the transactions (e.g., item identification, transaction amount and the like). In other such embodiments of the system 600, the event processing module 910 is a financial transaction processing module and the event notification 920 is a financial transaction notification that provides attributes associated with a previously conducted financial transaction. In specific embodiments of the invention, the event processing module 910 is configured to provide the event notification 920 in real-time to completion of the event 812. For example, in those embodiments in which the event processing module 910 is defined as a financial transaction processing module, completion of the financial transaction may immediately trigger generation and communication of the event notification 920 (i.e., financial transaction notification).

The virtual reality experience module 810 is further configured to access, via distributed communication network 610, database 1010 to retrieve attributes 1030 associated with the user 1020 (i.e., the user associated with the event 812). In specific embodiments of the invention, the database 1010 is stored remotely at server(s) 1000 or the like. The attributes 1010 may be any information associated with the user 320 that has an effect on a future state/condition of the user. In specific embodiments of the invention, the attributes 330 may be financial performance/outlook attributes that provide an indication of the user's current financial performance/status/outlook. For example, the financial performance outlook may include, but is not limited to, current savings, current rate at which funds are being saved, current loan balances, current loan re-payment status, current inflow and outflow of financial resources. In addition, current financial performance outlook may include, but is not limited to, future planned events effecting finances, such as home purchases, college tuition, weddings and the like.

In addition, attributes 1030 associated with the user 102 may include personal information stored in a user profile or the like, such as information that identifies the names, ages and genders of family members and the like, addresses, affinities to group, schools, teams and the like. Such information may be instrumental in personalizing the virtual reality experience, such that virtual reality experience includes family members, group/schools and teams that the user has an affinity for and the like.

In response to receiving the input 820 and the attributes 1030, the virtual reality experience module 810 configured to generate a virtual reality experience 820 that depicts a predicted future state 820 of the user 1030 based at least one the input 820 and the attributes 1030 associated with the user. In addition, the module 810 may be configured to determine the predicted future state 822 for a predetermined future time period 824. The predetermined future time period 824 may be a date or a certain number of months, years in the future and may be defined within the module 810 either by the module provider or customized by the user. In addition, the predetermined future time period 822 may be defined dynamically by the user as a part of the input 820 or close in proximity to the time of the input 820.

In specific embodiments of the system 600, the virtual reality experience may depict a future state 822 (i.e., existence or life) for the user based on the input 820 and the attributes 1030 associated with the user. Thus, in those embodiments in which the input 820 is associated with a financial transaction and the attributes are associated with the user's current financial performance/status/outlook, the virtual reality experience module 810 uses the financial transaction and/or the user's current financial performance/ status/outlook in determining what the future holds or what the outlook in the future is for the user and tailors the virtual reality experience accordingly. For example, the user may be on a financial path that indicates that the user will be a home owner, own/lease a luxury vehicle and the like and the virtual reality experience will reflect such (i.e., the user will be presented a display of a virtual environment that includes the user living in a house and driving a luxury vehicle. Conversely, the user may be on a financial path that indicates that the user will live modestly, perhaps live in a rental unit and not own/lease a vehicle (i.e., use public transportation or the like) and the virtual reality experience will reflect such (i.e., the user will be presented a display of a virtual environment that includes the user living in an apartment and using public transportation. As the user's attributes (i.e., financial performance/outlook attributes) change over time, the virtual reality experience is configured to automatically update to reflect changes in the predicted future state of the user (i.e., the lifestyle may improve based on improvements in the user's financial performance/outlook attributes or the lifestyle may decrease based on regression in the user's financial performance/outlook attributes.

In specific embodiments of the invention the user may select a specific future life event and the virtual reality experience may be generated around the selected future life event. For example, the user may select a college experience, a wedding experience, a retirement experience or the like and the virtual reality experience will be generated or updated to reflect the selected the future life event.

In other specific embodiments of the invention, the virtual reality experience in generated or updated on-the-fly, in response to input 820 and/or changes in attributes 1040. In such embodiments, in which the virtual reality experience is dynamically updated, the user may be notified, via an alert or the like, that the virtual experience has been generated or updated to reflect the input 820 and/or changes in the attributes 1030. The alert/notification may be configured to allow the user to access the virtual reality experience immediately, via the OHMD 702 of the wearable device 700-1 or the display of the mobile computing device 700-2.

Figure 5:
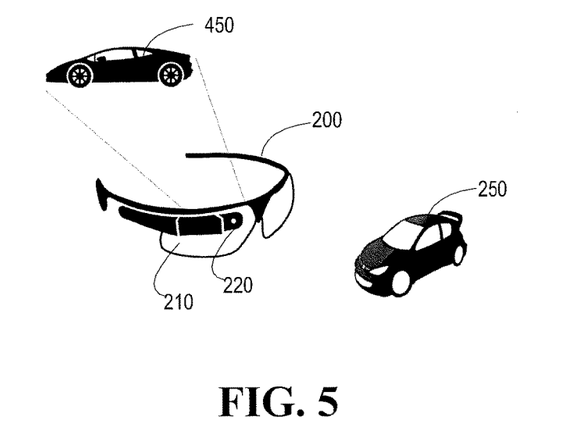
FIG. 5 is schematic diagram of a wearable computing device having an Optical Head-Mounted Display (OHMD) for providing an augmented reality display of a predicted future state of an object, in accordance with embodiment of the present invention.

Referring to FIG. 5, a schematic diagram is shown that highlights an augmented reality presentation of a future state of an object, in accordance with embodiments of the present invention. A user wearing the wearable computing device 200 will initially view an actual object 250, such as vehicle that the user possesses or desires to possess. Once the image-capturing device 220 of the wearable computing device 210 has captured an image of the object, the image has been identified, and attributes associated with the user have been retrieved, the future state 450 of the object may be determined and displayed in an augmented reality fashion within the OHMD 210. For example, in the illustrated embodiment of FIG. 5 the actual object is a modest vehicle and the future state 450 of the object is a sports/luxury vehicle. When viewing the actual surrounding/environment, the user's view is augmented to include the future state 450 of the object as opposed to the actual object 250. As previously noted the future state 450 of the object will move in a realistic fashion, within the OHMD based on movement by the user and/or movement of the actual object.

Figure 6A:
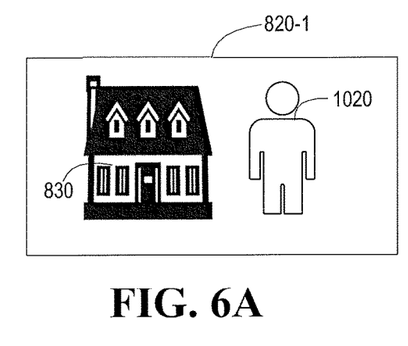
FIGS. 6A and 6B are diagrams of displays configured to present a virtual reality presentation of a user's predicted future state, in accordance with embodiment of the present invention.
Figure 6B:
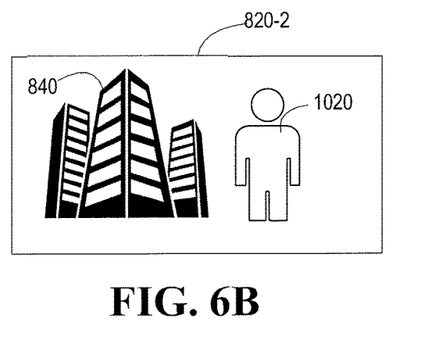

Referring to FIGS. 6A and 6B schematic diagram diagrams are shown of exemplary virtual reality experiences of a user's predicted future state, in accordance with embodiments of the present invention. The virtual reality experiences 820-1 and 820-2 may be displayed on any computing device having a display; however, wearable devices including OPHMDs are especially suitable for creating a more realistic, and in some embodiments, 3-dimensional, virtual reality environment. Specifically, FIG. 6A shows virtual reality experience 820-1 in which the user 1020 is placed in a virtual environment in which the user 1020 lives a house 830, while in FIG. 6B the virtual reality experience 820-2 depicts the user 1020 living in an apartment 840. In specific embodiments of the invention, the user is placed in a virtual reality environment in which the user lives in a house as opposed to an apartment (or vice versa) based on the predicted future financial outlook of the user. Additionally, while FIGS. 6A and 6B are limited to showing the living arrangement of the user, the virtual reality environment may include other facets of the user's predicted future state/life that may be effected by the user's attributes, such as financial performance indicators, financial status, predicted life events and the life. While the user 1020 is shown in the virtual reality experiences, the reader will note that in certain virtual reality experiences the user is not depicted in the virtual reality environment but rather the user experiences the virtual reality environment.

Thus, systems and the like have been disclosed that provide for a virtual reality experience of a user's predicted future state based on the occurrence or contemplation of an event and attributes associated with the user. Additionally, systems that have been disclosed provide for an augmented reality experience that replaces an actual viewed object with an augmented display of a future predicted state object based attributes associated with a user. As such, embodiments of the invention allow for a user to readily comprehend what their future state will or might be based the occurrence of an event and attributes associated with the user and/or what a future state of a physical object will or might be based on attributes associated with the user.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing an augmented reality display of a predicted future state of an object, the system comprising:
   a wearable computing device including a memory, at least one processor in communication with the memory, an image-capturing device in communication with the processor, and an Optical Head-Mounted Display (OHMD) in communication with the processor;

a database configured to store attributes associated with a user of the wearable computing device; and a predicted future state module stored in the memory, executable by the processor and configured to:
- capture, via the image-capturing device, an image of an actual object,
- identify the actual object,
- retrieve, from the database, one or more attributes associated with the user,
- predict a future state of the actual object based on the identification of the actual object and the one or more attributes associated with the user, and
- display, in the OHMD, an augmented reality view that replaces the actual object with the predicted future state of the actual object, wherein the predicted future state is one of (i) a virtual future condition of the actual object, or (ii) a virtual replacement object that replaces the actual object.

2. The system of claim 1, wherein the predicted future state module is further configured to identify the actual object by implementing one or more object recognition techniques.

3. The system of claim 1, wherein the predicted future state module is further configured to identify a current state of the actual object.

4. The system of claim 3, wherein the predicted future state module is further configured to predict the future state of the actual object based on the identification of the actual object, the current state of the actual object and the one or more attributes associated with the user.

5. The system of claim 3, wherein the predicted future state module is further configured to identify the current state of the actual object, wherein the current state includes a current value of the actual object.

6. The system of claim 5, wherein the predicted future state module is further configured to predict the future state of the actual object based on the identification of the actual object t, the current value of the actual object and the one or more attributes associated with the user.

7. The system of claim 1, wherein the predicted future state module is further configured to predict a future state of the actual object based on the identification of the actual object and the one or more attributes associated with the user, wherein the future state is for a predetermined future period in time.

8. The system of claim 7, wherein the predicted future state module provides for the user to configure the predetermined future period in time either prior to capturing the image of the actual object or after capturing the image of the actual object.

9. The system of claim 1, wherein the database configured to store the attributes, further defines the attributes as financial performance attributes associated with the user and wherein the predicted future state module is further configured to predict the future state of the actual object based on the identification of the object and the one or more financial performance attributes.

10. The system of claim 9, wherein the database configured to store the financial performance attributes, further defines the financial performance attributes as at least one of current savings amount, historical savings performance, current loan amounts, historical loan repayment performance, and current financial inflow and outflow.

11. A system for providing a user a virtual reality experience of a future state of the user, the system comprising:
- a mobile computing device including a memory and at least one processor in communication with the memory;
- a database configured to store attributes associated with a user of the mobile computing device; and
- a virtual reality experience module stored in the memory, executable by the processor and configured to:
  - receive an input that indicates an occurrence or contemplation of an event associated with the user,
  - retrieve, from the database, one or more, attributes associated with the user,
  - generate at least two virtual reality experiences of a future state of the user, wherein a first virtual reality experience is based on the event being contemplated occurring and the one or more attributes associated with the user and a second virtual reality experience is based on the event being contemplated not occurring and the one or more attributes associated with the user, and
  - provide for the at least two virtual reality experiences to be displayable to the user, on the mobile computing device, in response to the occurrence of the event or the contemplation of the event.

12. The system of claim 11, wherein the mobile computing device is further defined as a wearable computing device including an Optical Head-Mounted Display (OHMD) that is configured to display the virtual reality experience to the user.

13. The system of claim 11, wherein the virtual reality experience module is further configured to generate the at least two virtual reality experiences of the future state of the user, wherein the first virtual reality experience is based on the event being contemplated occurring and the one or more attributes associated with the user and the second virtual reality experience is based on the event being contemplated not occurring and the one or more attributes associated with the user, wherein the future state is defined by a predetermined future time period.

14. The system of claim 11, wherein the virtual reality experience module provides for the user to configure the predetermined future time period.

15. The system of claim 11, wherein the database configured to store attributes associated with a user further defines the attributes as profile attributes associated with the user and financial attributes associated with the user.

16. The system of claim 15, wherein the financial attributes include one or more of historical transaction records, current savings amount, current rate of savings, current inflow and outflow of finances, and financial goals.

17. The system of claim 15, wherein the virtual reality experience module is further configured to receive an input that indicates an occurrence of the event or contemplation of the event associated with the user, wherein the event is further defined as a financial transaction.

18. The system of claim 17, wherein the virtual reality experience module is further configured to generate the at least two virtual reality experiences of a financial trajectory of the user based on the occurrence of the financial transaction or contemplation of the financial transaction and the one or more financial attributes associated with the financial transaction.

* * * * *